United States Patent [19]

Takahashi et al.

[11] Patent Number: 4,848,082

[45] Date of Patent: Jul. 18, 1989

[54] EXHAUST GAS PURIFYING DEVICE FOR MARINE ENGINE

[75] Inventors: Masanori Takahashi; Tatsuki Uchida, both of Hamamatsu, Japan

[73] Assignee: Sanshin Kogyo Kabushiki Kaisha, Hamamatsu, Japan

[21] Appl. No.: 79,022

[22] Filed: Jul. 29, 1987

[30] Foreign Application Priority Data

Jul. 29, 1986 [JP] Japan .................. 61-178377

[51] Int. Cl.⁴ .............................................. F01N 3/28
[52] U.S. Cl. .................................... 60/285; 60/277; 60/288; 440/89
[58] Field of Search ............... 60/288, 277, 284, 285; 440/89

[56] References Cited

U.S. PATENT DOCUMENTS

| | | | |
|---|---|---|---|
| 3,927,523 | 12/1975 | Shioyama | 60/284 |
| 3,988,890 | 11/1976 | Abthoff | 60/274 |
| 4,215,538 | 8/1980 | Steinwart | 60/288 |

FOREIGN PATENT DOCUMENTS

| | | | |
|---|---|---|---|
| 52-8932 | 3/1977 | Japan . | |
| 70222 | 6/1977 | Japan | 60/288 |
| 55-10043 | 1/1980 | Japan . | |
| 55-14977 | 2/1980 | Japan . | |
| 55-19939 | 2/1980 | Japan . | |
| 55-19940 | 2/1980 | Japan . | |
| 57-150099 | 9/1982 | Japan . | |
| 57-151200 | 9/1982 | Japan . | |

Primary Examiner—Douglas Hart
Attorney, Agent, or Firm—Ernest A. Beutler

[57] ABSTRACT

A catalytic exhaust system for an outboard motor wherein a throttle control arrangement is incorporated for assuring rapid heating of the catalyst to its operating temperature.

9 Claims, 4 Drawing Sheets

4,848,082

EXHAUST GAS PURIFYING DEVICE FOR MARINE ENGINE

BACKGROUND OF THE INVENTION

This invention relates to an exhaust gas purifying device for marine engines and more particularly to a device that will insure exhaust gas purification under all running conditions.

Although exhaust emission control has been practiced for a fairly substantial period of time in connection with motor vehicles such as automobiles and motorcycles, it has only been recently that there has been an interest in purifying the exhaust gases of marine engines such as outboard motors. In some ways, it is even more important to purify the exhaust gases of a marine engine since frequently the exhaust gases are discharged through the body of water in which the watercraft is operating back to the atmosphere. Therefore, in addition to the removal of certain atmospheric harmful constituents from the exhaust gases, it is desirable to insure that materials which might contaminate the body of water in which the watercraft is operating are also removed from the exhaust gases. In addition to removing different types of contaminates from the exhaust gases in marine applications from land applications, the running conditions of the marine engine are substantially different from those of automotive engines. Specifically, it is quite a common occurrence that a marine engine will be started and operated at low speeds for long periods of time. For example, it is quite common for a marine engine to be started and operated at trolling speeds for a long period of time. This gives rise to a considerable problem in connection with the use of catalytic exhaust treatments.

As is well known, a catalyst has a certain minimum operating temperature below which is not effective in achieving the desired gas treatment. Although the catalyst has a minimum operative temperature, it is also well known that once a catalyst reaches its operating temperature, the reaction of the exhaust gases tends to cause the catalyst to remain heated even though the exhaust gas temperature may be relatively low.

It is, therefore, a principle object of this invention to provide an improved exhaust gas purifying device for a marine engine.

It is a further object of this invention to provide an exhaust gas purifying device for a marine engine wherein a catalyst is employed wherein the catalyst will be heated even though the engine is started and operated in conditions when the catalyst would not be normally heated to its operating temperature.

It is a yet further object of this invention to provide an improved arrangement for bringing a catalytic exhaust gas purifier for a marine engine up to its operating temperature rapidly and regardless of the engine operating conditions.

SUMMARY OF THE INVENTION

This invention is adapted to be embodied in an outboard motor that has a power head which contains an internal combustion engine. An exhaust system is provided for the engine for discharging the exhaust gases to the atmosphere. A catalyst is provided in the exhaust system for effecting reaction of the exhaust gases to remove or render harmless unwanted constituents from them. Means are provided for sensing the temperature in the exhaust system and for operating the engine in a manner to raise the temperature in the exhaust system when the sensed temperature in the exhaust system is less than a predetermined amount.

DETAILED DESCRIPTION OF THE PREFERRED EMBODIMENT OF THE INVENTION

Figure 1:
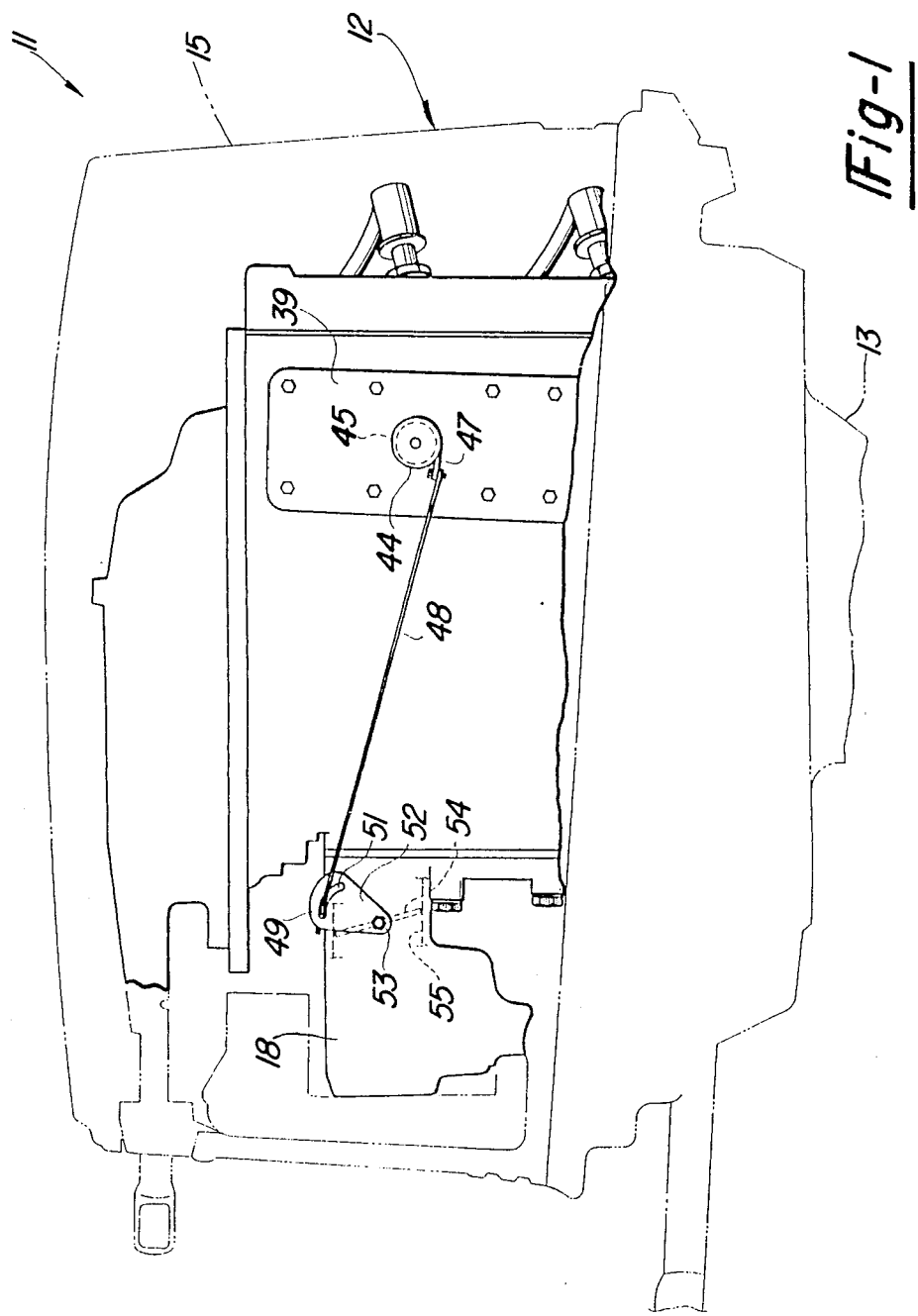
FIG. 1 is a side elevational view of the power head of an outboard motor constructed in accordance with a first embodiment of the invention, with portions shown in phantom.
Figure 2:
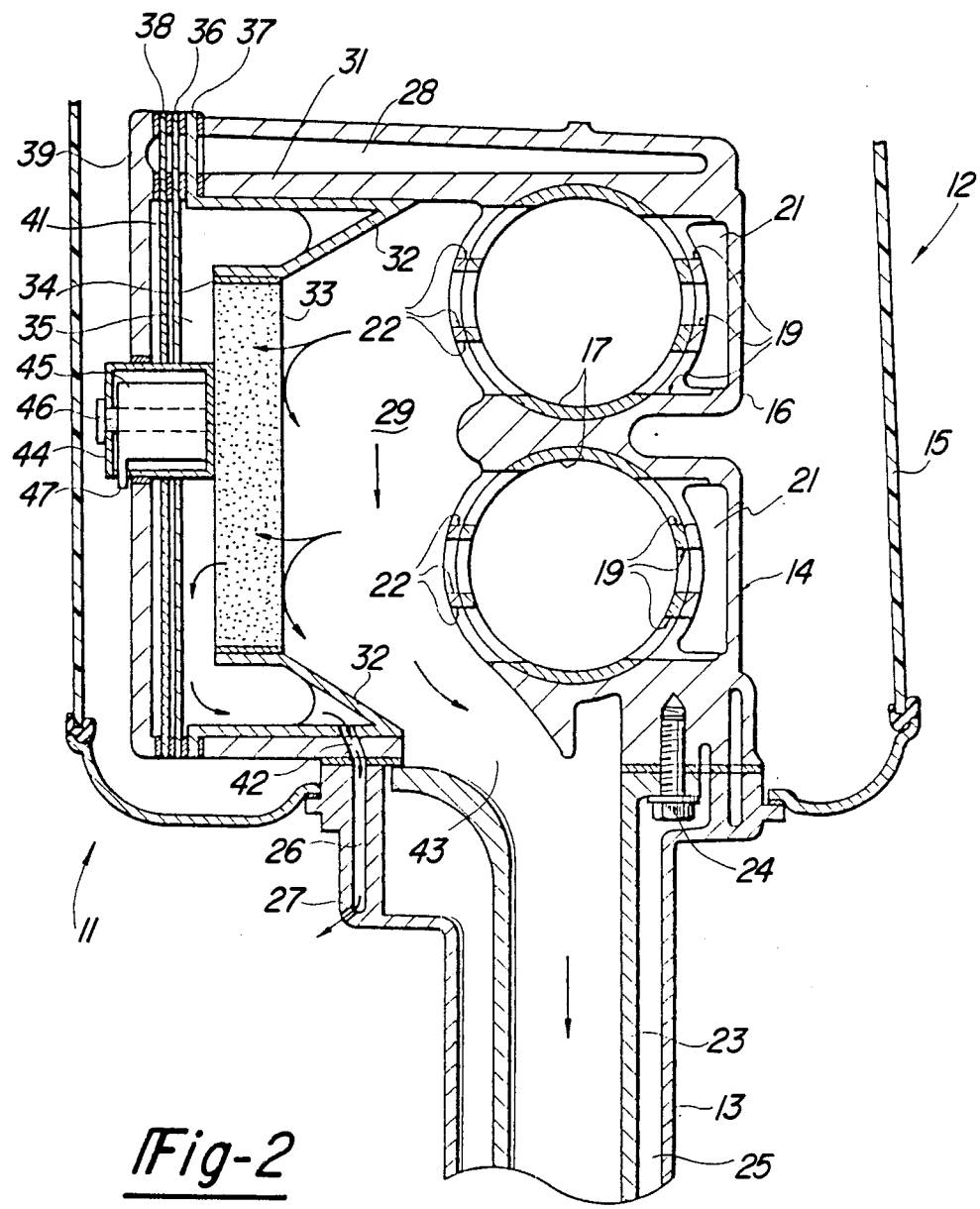
FIG. 2 is an enlarged cross-sectional view taken through a portion of the power head of this embodiment.

Referring first to the embodiment of FIG. 1 and 2 and initially to FIG. 1, an outboard motor is identified generally by the reference numeral 11. The outboard motor 11 includes a power head 12, drive shaft housing 13 and lower unit (not shown). Inasmuch as the invention relates to the construction of the power head 12 and the exhaust gas treatment therefor, only that portion of the outboard motor 11 is shown in detail.

Referring now additionally to FIG. 2, the power head 12 is comprised of an internal combustion engine, indicated generally by the reference numeral 14. The engine 14 may be of any known type and is depicted as being of the two-cylinder in-line crankcase compression, spark-ignited type. The engine 14 is surrounded by a protective cowling 15 which is shown in phantom in FIG. 1.

The engine 14 is only shown partially since the significant features of the invention, as has been noted, deal with its exhaust system. Where not described, the components of the engine 14 may be considered to be conventional. The engine 14 includes a cylinder block 16 in which cylinder liners 17 are fixed. The cylinder liners 17 support reciprocating pistons (not shown) that drive the engine output shaft through connecting rods in a well-known manner. As has been previously noted, the engine is of the two-cycle type and operates on a crankcase compression principle. Therefore, a fuel/air mixture is delivered to the crankcase chambers of the engine from one or more carburetor 18 (FIG. 1) and is transferred to the area above the pistons through scavenge ports 19 and scavenge passages 21 formed at one side of the cylinder block 16.

The exhaust gases from the individual combustion chambers are discharged through exhaust ports 22 into an exhaust system, to be described. The exhaust ports 22 are disposed diametrically opposite to the scavenge ports 19 so as to provide loop type scavenging for the engine.

The exhaust system for the engine 14 includes an exhaust pipe 23 that is affixed to the lower face of the cylinder block 16 by means of fasteners 24. The exhaust pipe 24 depends into an expansion chamber 25 formed within the drive shaft housing 13. The expansion chamber 25 serves to permit expansion and cooling of the exhaust gases before they are discharged through an underwater, high-speed exhaust gas discharge (not shown) formed in the lower unit. Any form of underwater exhaust gas discharge of a known type may be employed for such discharge.

The exhaust system also includes a low-speed, above-the-water exhaust gas dicharge which includes an expansion chamber 26 that is formed in the upper portion of the drive shaft housing 13. Exhaust gases are discharged to the atmosphere under low-speed running through an above-the-water exhaust gas discharge 27 which is formed in the drive shaft housing 13 and which directly communicates with the expansion chamber 26.

The engine 14 is also provided with a cooling system. In the illustrated embodiment, the engine 14 is water cooled and draws cooling water from the body of water in which the watercraft is operating in a known manner. This water is circulated in a suitable manner through a cooling jacket of the engine which includes a cylinder block cooling jacket 28. The coolant is then discharged back into the body of water in which the watercraft is operating in any suitable manner.

An arrangement is provided for treating the exhaust gases before their discharge to the atmosphere either through the high-speed underwater exhaust gas discharge or through the low speed above the water exhaust gas discharge 27. This treatment system includes a collector section 29 that is formed in the cylinder block 16 in direct communication with the exhaust ports 22. The collector section 29 opens through one side 31 of the cylinder block 16. This opening is, however, closed by means including a supportng bracket 32, which, in turn, defines a generally open area that is closed by a perforate catalyzer bed 33.

The bed 33 is positioned in direct registry with the exhaust ports 22 and exhaust gases are channeled toward the catalyzer bed 33 by inclined surfaces of the supporting bracket 32. The catalyzer bed 33 is supported by a ceramic mat 34 within an opening of the supporting bracket 32. The bed 33 is porous so that exhaust gases can pass through the bed 33 in a manner to be described.

A volume 35 is formed between the outer surface of the catalyzer bed 33 and a cover plate 36. The cover plate 36 overlies a flange 37 of the bracket 32 and has affixed to it a further cover plate 38. The cover plates 36 and 38 are separated slightly from each other so as to define an insulating air gap. An outer cover plate 39 completes the assembly for closing the opening in the portion 31 of the cylinder block 16. A still further air gap 41 is provided between the outer cover plate 39 and the cover plate 38 for further heat insulation.

The bracket 32 and cylinder block 16 are provided with a low-speed exhaust gas passage 42 that communicates the chamber 35 with the auxiliary expansion chamber 26 for delivering low-speed exhaust gases to the low speed above the water exhaust gas discharge port 27.

The exhaust gases may also flow from the collector section 29 to the exhaust pipe 23 through a high-speed exhaust gas passage 43.

The operating of the embodiment will now be described. When the outboard motor 11 is powering the associated watercraft at a high speed and the watercraft is, therefore, in a planning condition, there will be a fairly large exhaust gas pressure and the underwater high-speed exhaust gas discharge will be relatively shallowly submerged. Under this condition, the exhaust gases will issue from the exhaust ports 22 at a high speed and impinge upon the catalyst bed 33. There will be sufficient contact under these conditions for the exhaust gases to become in contact with the catalyzer material for their effective treatment. The exhaust gases are then redirected to the passage 43 and exhaust pipe 23 for discharge through the high-speed underwater exhaust gas discharge.

Under the high-speed exhaust gas condition, the flow resistance of the catalyzer bed 33 and the size of the passage 42 and above-the-water exhaust gas discharge 27, the latter of which are quite restricted, will prevent any significant discharge of exhaust gases to the atmosphere directly through the discharge 27. However, any gases that are discharged under this condition will have flown through the catalyzer bed 33 and have been effectively treated.

When the watercraft is operating at a slow speed, however, the underwater high-speed exhaust gas discharge will be submerged sufficiently so as to preclude any exhaust gases from passing out of this discharge. Under this condition, the exhaust gases will flow through the catalyzer bed 33 before discharge through the passage 27. hence, the exhaust gases are effectively treated by the catalyzer bed 33 regardless of whether they are discharged to the atmosphere through the high-speed exhaust gas discharge or the low-speed exhaust gas discharge 27. Also, because of the location of the catalyzer bed 33 in confronting relationship with the exhaust ports 22, it will be unnecessary to place the catalyzer bed in a flow restricting position for high-speed exhaust gas discharge where the exhaust gases must pass through it. Hence, there is effective treatment under most running conditions with a relatively simple construction.

As noted in the preceding paragraph, the described construction provides extremely effective exhaust emission control under most normal running conditions. However, with an outboard motor or marine engine, unlike automotive applications, there is a certain running condition under which the described system may not satisfactorily treat the exhaust gases.

As is well known, an exhaust catalyzer requires a certain minimum operating temperature in order to become effective. Once the catalyzer reaches this temperature, the chemical reaction is such that the catalytic material will be maintained at its reactive temperature and the device is generally self-sustaining. However, with an outboard motor, it is quite often a condition of running that the engine is started and then is operated at low speeds for long periods of time. This may occur if the motor is started and a trolling operating is commenced immediately. Automotive applications normally do not cause such running conditions wherein an engine is started and then operated at idle or low speed for long periods of time. As a result, with automotive applications, the catalyzer may soon become heated and once heated to a minimum operating temperature, it will become self-sustaining.

In accordance with the invention, an arrangement is provided for operating the engine in such a way that the temperature of the catalyst 33 will be raised to its operating temperature very quickly so as to insure that the reaction will be self-sustaining even though the engine is started and operated at idle for a long period of time. This mechanism will now be described.

In accordance with the invention, there is provided a housing 43 that is mounted in the outer cover place 39 and which penetrates through the inner cover plates 36 and 38 and enters into the cavity 35. In the illustrated embodiment, the housing 44 is positioned in direct contact with the catalytic bed 33 so as to promote direct heat transfer. It is to be understood, however, that the housing 44 may be positioned in any area where the heated exhaust gases flow so that it will sense exhaust gas temperature.

Contained within the housing 44 is a temperature responsive element such as a bi-metallic spring 45 that is wound around an axis defined by a central support pin 46 that is fixed in a suitable manner relative to the outer housing 44. The bi-metallic spring 45 has an outwardly projecting free end 47 that is connected to one end of a link 48 (FIG. 1). The opposite end of the link 48 is offset, as at 49, and is received within a slot 51 formed in a lever 52.

The lever 52 is, in turn, affixed to a throttle valve shaft 53 of the carburetor 18. The throttle valve shaft 53 has affixed to it a throttle valve 54 that controls the flow of air/fuel mixture through an induction passage 55 of the carburetor 18 in a known manner. A suitably operable manner throttle actuating mechanism is connected to the throttle valve shaft 53 for manually positioning the throttle valve under operator control.

It should be noted that the length of the slot 51 is such that the operator can freely position the throttle valve 54 in any desired degree of opening. However, in the event the engine is operating in the idle position as shown in FIG. 1 and the catalytic bed 33 has not become heated, the bi-metallic spring 45 will deflect so as to cause the end 47 to move the link 48 to the left as shown in FIG. 1 and to partially open the throttle valve 54. As a result, the engine operating speed will be increased sufficiently so as to cause heating of the catalytic bed 33 and bi-metallic spring 45. When the bed 33 reaches the predetermined minimum operating temperature, the spring 45 will tension and draw the rod 48 to the right as shown in FIG. 1 so that the throttle valve 54 may return to its idle position. As has been noted, the link 48 and specifically the cooperation of its end 49 with the slot 51 will not interfere with normal operator controlled opening movement of the throttle valve nor of the turn of the throttle valve to the position at which the bi-metallic spring 45 controls the position.

Figure 3:
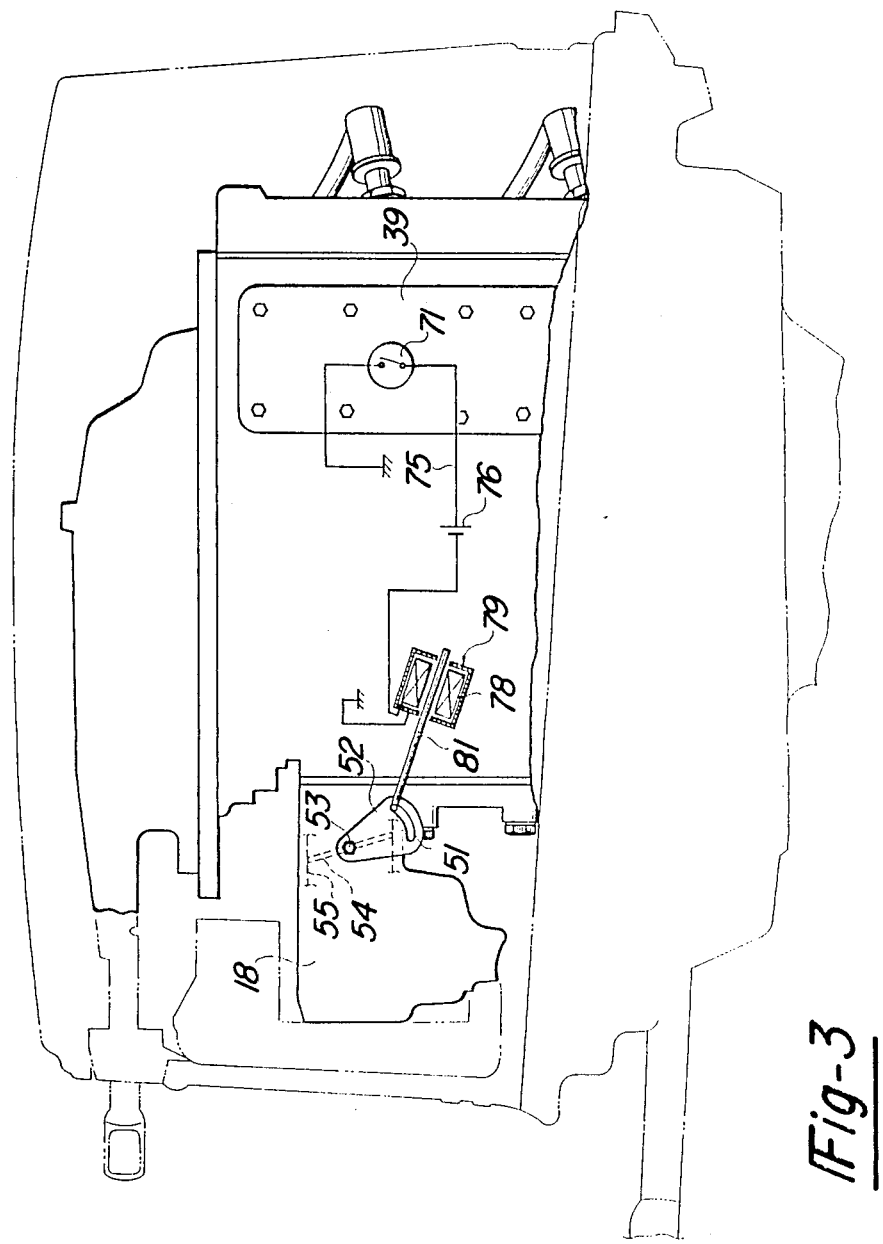
FIG. 3 is a side elevational view, in part similar to FIG. 1, showing a power head constructed in accordance with another embodiment of the invention, with portions shown in phantom.
Figure 4:
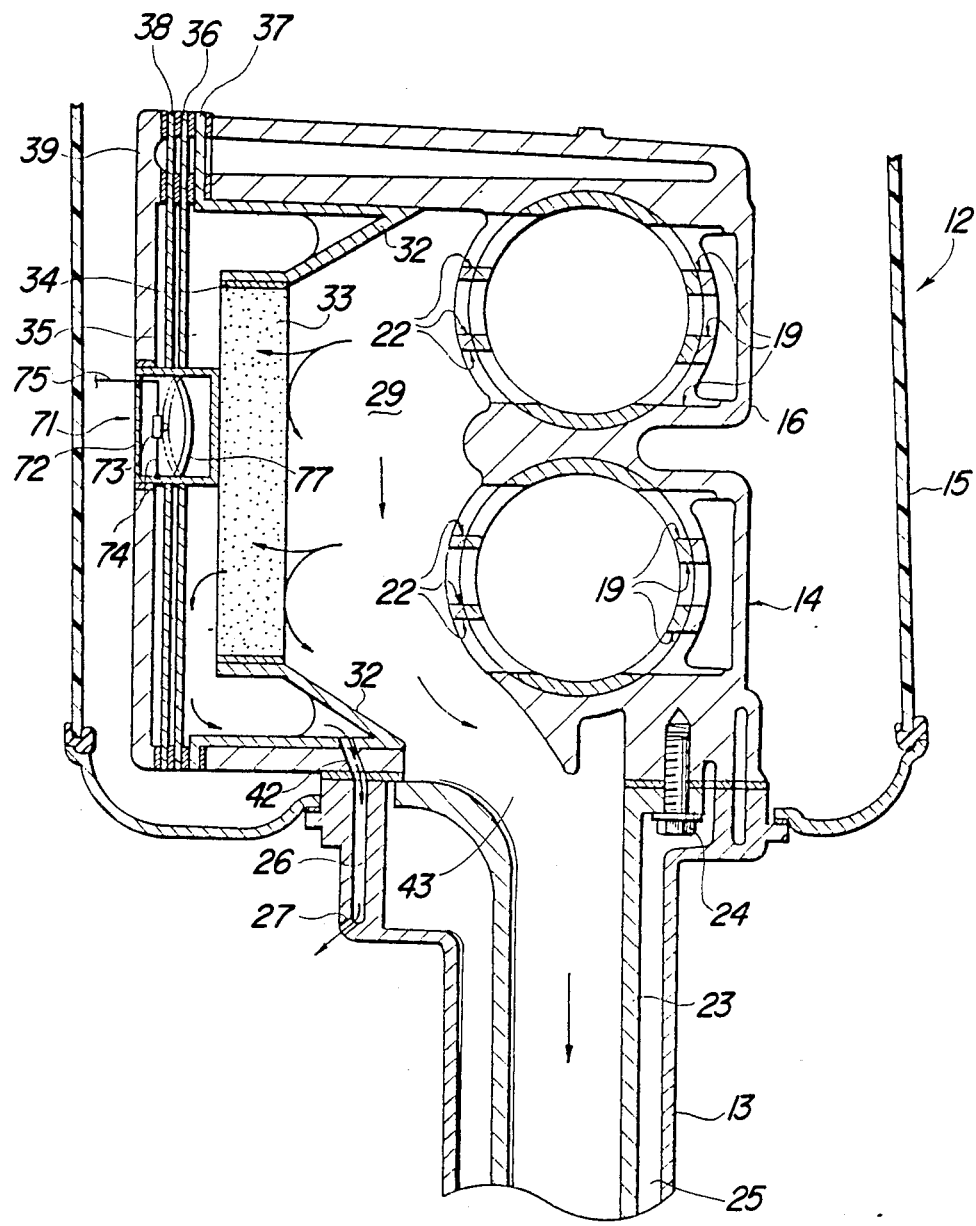
FIG. 4 is an enlarged cross-sectional view of the embodiment of FIG. 3.

FIGS. 3 and 4 show another embodiment of the invention and which is generally similar insofar as the catalytic bed and its relationship to the internal combustion engine is concerned. For that reason, those components which are the same as those of the embodiment in FIGS. 1 and 2 have been identified by the same reference numerals and will be described again only insofar as is necessary to understand the construction and operation of this embodiment.

In this embodiment, a temperature responsive switch, indicated generally by the reference numeral 71, has an outer housing 72 that is mounted within the cover plates 39, 38 and 36 like the housing 44 of the previously described embodiment. The housing 72 is, in the illustrated embodiment, positioned in direct heat exchanging relationship to the catalysts' bed 33. As would be previously described embodiment, the housing 72 may be merely positioned so that it senses the exhaust gas temperaure in proximity to the catalyst bed 33.

Included within the housing 72 is a fixed contact 73 that is connected by a conductor 74 to the housing 72 and, accordingly, is thus grounded as schematically shown in FIG. 3. The other end of the fixed contact 72 is connected by a conductor 75 to an electrical source such as a battery 76.

The bi-metallic wave washer 77 is contained within the housing 72 and is in thermal contact with it. When the temperature of the bi-metallic element 77 is below a predetermined temperature, the bi-metallic element will snap to a convex position as viewed from the left in FIG. 4 and will contact the switch element 72 and complete the circuit through it from the conductor 75 to the ground conductor 74. When the temperature is above the predetermined temperature, the operating temperature of the catalytic bed 33, the bi-metallic spring 77 will snap to the solid line position as shown in FIG. 4 wherein it assumes a convex shape as viewed from the left and the switch 73 will return to its normally opened position.

Conductor 75 is also in circuit with a winding 78 of a solenoid 79. The solenoid 79 has an armature 81 that has an end which is received within the slot 51 of the lever 52. When the solenoid 79 is not energized, the position of the throttle valve 54 will be unaffected. However, when the solenoid 79 is energized, the armature 81 will move inwardly to the right as shown in FIG. 3 and the lever 52 will be pivoted in a counterclockwise director so as to open the throttle valve 54 and operate the engine under a condition in which the catalytic bed 33 will be rapidly heated to its operating condition. At this time, the temperature responses switch 71 will open and the throttle valve 54 will return to its normal position. As with the previously described embodiment, the operation of the throttle valve does not interfere with normal manual actuation of it.

In the two embodiments of the invention thus far illustrated, the catalytic bed has been heated by means of increasing the throttle opening of the engine. It is to be understood that various other ways may be employed for heating the catalytic bed 33. Such other ways may be the addition of further fuel into the engine so as to cause it to run rich or any of the other known expedience for elevating exhaust gas temperatures.

In addition to the embodiments illustrated and described, various other changes and modifications may be made without departing from the spirit and scope of the invention, as defined by the appended claims.

We claim:

1. In an outboard motor having a power head containing an internal combustion engine, said engine having an exhaust port for discharging exhaust gases, an exhaust system for said engine for discharging exhaust gases from said exhaust port to the atmosphere, a catalyst in said exhaust system for effecting the reaction of the exhaust gases, and means for operating said engine in a manner to raise the temperature in said exhaust system when the sensed temperature is less than a predetermined amount, said exhaust system comprising an underwater exhaust gas discharge for discharging exhaust gases at a point below the water level, an above-the-water exhaust gas discharge for discharging exhaust gases to the atmosphere above the water level and conduit means for delivering exhaust gases from said exhaust port to said underwater exhaust gas discharge and to said above-the-water exhaust gas discharge, said catalyzer being disposed in said conduit means for contacting the exhaust gases passing from said exhaust port before entry to the atmosphere through one of said exhaust gas discharges.

2. In an outboard motor as set forth in claim 7 including means for sensing the temperature in said catalyst, and wherein the predetermined temperature is the operating temperature of said catalyst.

3. In an outboard motor as set forth in claim 2 wherein the means for operating the engine in a manner to raise the temperature in the exhust system comprises means for increasing the speed of the engine.

4. In an outboard motor as set forth in claim 2 wherein the means for sensing the temperature comprises a bi-metallic spring.

5. In an outboard motor as set forth in claim 2 wherein the means for sensing the temperature comprises a temperature responsive switch.

6. In an outboard motor as set forth in claim 1 wherein the exhaust gas catalyzer comprises a catalyzer bed and the exhaust gases must flow through said bed before discharge to the atmosphere through at least one of the exhaust gas discharges.

7. In an outboard motor as set forth in claim 6 wherein at least one exhaust gas discharge is the above-the-water exhaust gas discharge.

8. In an outboard motor as set forth in claim 6 wherein the exhaust gases discharged through the other exhaust gas discharge contact the catalyzer bed only through surface contact and need not flow therethrough.

9. In an outboard motor as set forth in claim 8 wherein the catalyzer bed is disposed in facing relationship to the exhaust port for impingement of the exhaust gases thereupon.

* * * * *

UNITED STATES PATENT AND TRADEMARK OFFICE
CERTIFICATE OF CORRECTION

PATENT NO. : 4,848,082

DATED : July 18, 1989

INVENTOR(S) : Takahashi, et al

It is certified that error appears in the above-identified patent and that said Letters Patent is hereby corrected as shown below:

Column 6, line 67, Claim 2, "7" should be --1--.

Signed and Sealed this

Twelfth Day of May, 1992

Attest:

DOUGLAS B. COMER

*Attesting Officer*    Acting Commissioner of Patents and Trademarks